US011356415B2

(12) United States Patent
Pendse

(10) Patent No.: US 11,356,415 B2
(45) Date of Patent: Jun. 7, 2022

(54) FILTER FOR SUSPICIOUS NETWORK ACTIVITY ATTEMPTING TO MIMIC A WEB BROWSER

(71) Applicant: Arbor Networks, Inc., Westford, MA (US)

(72) Inventor: Bhargav Pendse, MH (IN)

(73) Assignee: Arbor Networks, Inc., Westford, MA (US)

( * ) Notice: Subject to any disclaimer, the term of this patent is extended or adjusted under 35 U.S.C. 154(b) by 129 days.

(21) Appl. No.: 16/855,157

(22) Filed: Apr. 22, 2020

(65) Prior Publication Data

US 2021/0281546 A1 Sep. 9, 2021

(30) Foreign Application Priority Data

Mar. 9, 2020 (IN) .............................. 202011010073

(51) Int. Cl.
*H04L 9/40* (2022.01)
*H04L 67/02* (2022.01)
*H04L 9/08* (2006.01)
*G06F 9/445* (2018.01)
*H04L 9/06* (2006.01)

(52) U.S. Cl.
CPC ...... *H04L 63/0245* (2013.01); *G06F 9/44526* (2013.01); *H04L 9/0643* (2013.01); *H04L 9/085* (2013.01); *H04L 63/0846* (2013.01); *H04L 63/1483* (2013.01); *H04L 67/02* (2013.01)

(58) Field of Classification Search
CPC ... H04L 63/0245; H04L 9/0643; H04L 9/085; H04L 63/0846; H04L 63/1483; H04L 67/02; H04L 9/12; H04L 9/0863; G06F 9/44526
See application file for complete search history.

(56) References Cited

U.S. PATENT DOCUMENTS

| | | | |
|---|---|---|---|
| 8,296,844 B2 * | 10/2012 | Bogner ................. | G06F 21/554 726/22 |
| 9,596,223 B1 * | 3/2017 | Mezei .................... | H04W 12/04 |
| 2008/0235794 A1 * | 9/2008 | Bogner .................. | G06F 21/83 726/22 |
| 2012/0124651 A1 * | 5/2012 | Ganesan ............... | H04L 9/3226 726/4 |

(Continued)

*Primary Examiner* — J. Brant Murphy
(74) *Attorney, Agent, or Firm* — Locke Lord LLP; Scott D. Wofsy; Christopher J. Capelli

(57) ABSTRACT

A method and system for detecting impersonated network traffic by a protected computing device and a network protection system. The method includes the computing device receiving installation of a browser application, the browser application configured to generate requests to communicate with other computers via the World Wide Web and receiving a configuration for the browser application. The browser application is configured to obtain a short-lived password (SLP) in coordination with generating a request and insert the short-lived password into the generated request before transmitting the request. The SLP is synchronized with an expected value generated by the network protection system. The transmitted request is passed to the network protection system and treated as legitimate network traffic by the network protection system only if the network protection system detects and verifies the SLP.

23 Claims, 4 Drawing Sheets

(56) References Cited

U.S. PATENT DOCUMENTS

| | | | | |
|---|---|---|---|---|
| 2013/0340071 | A1* | 12/2013 | Vellozo Luz | G06F 21/34 |
| | | | | 726/18 |
| 2017/0331801 | A1* | 11/2017 | Mezei | H04W 12/06 |
| 2017/0357799 | A1* | 12/2017 | Feher | G06F 21/34 |
| 2019/0342334 | A1* | 11/2019 | Yuan | H04L 63/1433 |
| 2020/0259798 | A1* | 8/2020 | Rene | H04L 9/08 |
| 2020/0358818 | A1* | 11/2020 | Stoletny | G06F 21/566 |
| 2021/0099495 | A1* | 4/2021 | Khanna | H04L 63/205 |

\* cited by examiner

FILTER FOR SUSPICIOUS NETWORK ACTIVITY ATTEMPTING TO MIMIC A WEB BROWSER

FIELD OF THE DISCLOSURE

The disclosed embodiments generally relate to computer network protection, and more particularly, to a system and method for filtering suspicious network activity attempting to mimic a web browser.

BACKGROUND OF THE DISCLOSURE

Networks are constantly exposed to security exploits that are of significant concern to network providers. For example, malware, which stands for malicious software, malicious software) is software that is intentionally designed to cause damage to a computer, server, client, or computer network. Malware can be used to access resources via the Internet, such as for purposes of exfiltration of data or unauthorized command and control, with the goal of evading detection. During data exfiltration, malware can be used to infiltrate a secure system and accessing secure information without permission. During unauthorized command and control, malware can be used to command a computer to perform actions and/or control the computer from an outside source that does not have permission to command or control the computer.

In order to evade detection, malware will sometimes impersonate an internet browser by using a user-agent string of a popular web browser, such as Chrome™ or Internet Explore™, etc. The impersonating malware can generate HTTP that originate from the malware, but appear to have originated from a genuine Internet browser.

Conventional methods and systems for filtering malware have generally been considered satisfactory for their intended purpose. However, there is still a need in the art for filtering malware that impersonates a legitimate web browser.

SUMMARY

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a method of detecting impersonated network traffic by a computing device of a protected network protected by a network protection system. In aspects of the disclosure, a computer system and computer-readable medium are provided that implement the method. The method includes receiving installation of a browser application, the browser application configured to generate requests to communicate with other computers via the World Wide Web and receiving a configuration for the browser application. The browser is configured to obtain a short-lived password in coordination with generating a request and insert the short-lived password into the generated request before transmitting the request. The short-lived password is synchronized with an expected value generated by the network protection system. The transmitted request is passed to the network protection system and treated as legitimate network traffic by the network protection system only if the short-lived password is verified by the network protection system.

In one or more embodiments, the requests are HTTP requests and the short-lived password is inserted into a header of the HTTP request.

In one or more embodiments, the method further includes generating the short-lived password using a time-based algorithm or a hash-based algorithm. In one or more embodiments, generating the short-lived password includes sharing a secret with the network protection system, and synchronization of the short-lived password and the expected value depends on sharing the secret.

In one or more embodiments, method of claim 1, wherein receiving the configuration for the browser application includes receiving installation of an extension or plugin that cooperates with the browser.

In one or more embodiments, when the request is treated as legitimate traffic by the network protection system, the request is forwarded to an intended destination indicated by the request, otherwise the request is treated as illegitimate traffic that is flagged as illegitimate and/or blocked from being sent to the intended destination.

In one or more embodiments, the short-lived password is verified when the short-lived password matches the expected value generated by the network protection system.

In a further aspect a method is disclosed of detecting impersonated network traffic by a network protection system that provides protection to a protected network. In aspects of the disclosure, a computer system and computer-readable medium are provided that implement the method. The method includes enabling synchronization with generation of short-lived passwords by the respective computing devices of the protected network, receiving a request for communicating with at least one other computer via the World Wide Web, and verifying, upon receiving the request, whether a short-lived password is included with the request. Upon verification that the short-lived password is included with the request, the method includes verifying synchronization of the short-lived password with an expected value. Upon verification of synchronization of the short-lived password, the method includes treating the request as legitimate network traffic. Otherwise, upon a lack of verification that the short-lived password is included with the request or a lack of verification of synchronization of the short-lived password, the method includes treating the request as illegitimate network traffic.

In one or more embodiments, the requests are HTTP requests and the short-lived password is inserted into a header of the HTTP request.

In one or more embodiments, the method further includes generating the expected value using a time-based algorithm or a hash-based algorithm. In one or more embodiments, generating the expected value includes sharing a secret with computing devices of the protected network, and synchronization of the short-lived password and the expected value depends on sharing the secret.

In one or more embodiments, treating the request as legitimate traffic includes forwarding the request to an intended destination indicated by the request, and treating the request as illegitimate traffic includes flagging the request as illegitimate and/or blocking the request from being sent to the intended destination.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
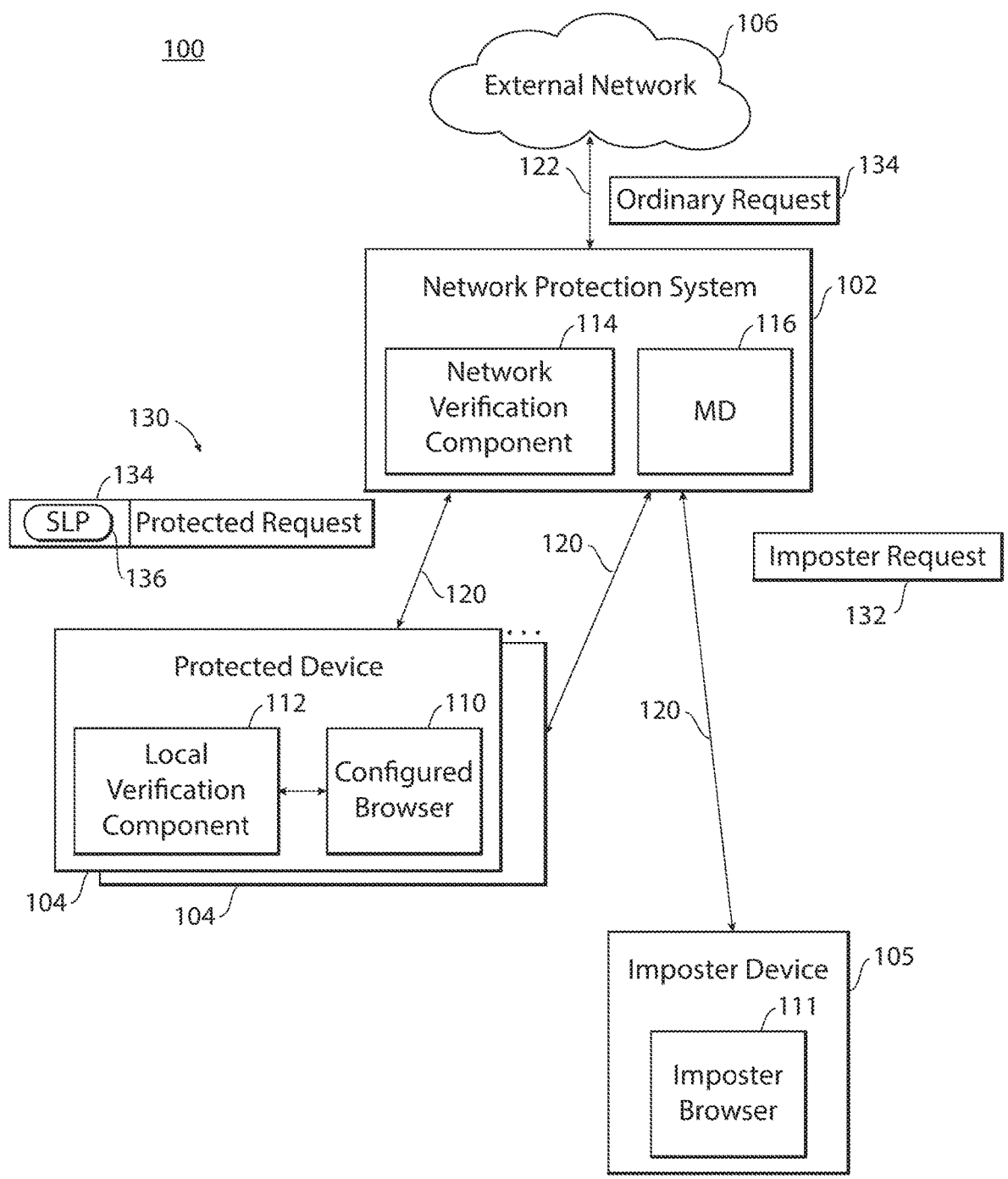
FIG. 1 illustrates a block diagram of an example protected network included in a network system operating with one or more communication networks in accordance with an aspect of the disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-4, as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, the network system 100 is provided, wherein network system 100 includes a protected network 140 that can facilitate internal communication within the protected network 140 and/or can communicate with external systems (not shown) via an external network 106.

The protected network 140 includes a network protection system 102 that protects one or more protected devices 104. The network protection system 102 can communicate with the external network 106 via one or more wired and/or wireless external communication links 122. Additionally, the network protection system 102 can communicate with the protected devices 104 via one or more wired and/or wireless internal communication links 120. Communications among the protected devices 104 and between the protected devices 104 and the external network 106 are monitored by the network protection system 102.

The protected devices 104 can generate and transmit requests, such as HTTP requests, for communicating with another computer. An HTTP request is a packet of information that one computer sends to another computer to communicate something. In particular, HTTP requests can be used to communicate with another computer via the World Wide Web.

The network protection system 102 includes or is associated with a network verification component 114 and optionally a mitigation device (MD) 116. In one or more embodiment, the network protection system 102 can be configured as a firewall. The network protection system 102 is configured to recognize, deter, and or prevent imposter requests 132 that were sent by an imposter device 105 that poses as a protected device 104. An imposter device 105 can be a protected device 104 that was affected by malware and commanded or controlled to transmit imposter requests 132. The imposter requests can impersonate requests from legitimate web browsers. The impersonation can include, for example, using user-agent strings of a legitimate web browser for evading detection. The web browser used for the impersonation can be a popular web browser (e.g., Chrome™, Firefox™, or Safari™) that may not raise suspicion to a user. However, the imposter requests can include malware that can be used for malicious purposes, such as to access secure information, exfiltrate data and/or to be installed on a device of the protected network 140, such as a protected device 104, to control and command that protected device 104.

Prior to operating as a protected device 104, an administrator installs a local verification component 112 and a browser 110 on the protected device 104 and configures the browser 110 to interact with the local verification device. The local verification device 112 is configured to generate a short-lived password (SLP) upon request. The configured browser 110 is configured to obtain an SLP 136 from the local verification device 112 each time the configured browser 110 generates an HTTP request and combine the SLP 136 in the HTTP request, which is then submitted as a protected request 130. The SLP 136 can be combined with the HTTP request, for example, by inserting the SLP 136 in a header of the HTTP request. In one or more embodiments, the SLP can be inserted a different portion of the HTTP request, such as a request line or body, with compensation provided for any side effects. The local verification component 112 is synchronized with the network verification component 114 of the network protection system 102 so that the network verification component 114 can verify each SLP 136 in HTTP requests transmitted from the protected devices 104 receive by the network protection system 102.

The network verification component 116 is configured to verify each HTTP request it receives from a protected device 104 by determining if the request includes an SLP 136 and if the SLP 136 is valid. Validity of the SLP is based on the synchronization between the local verification component 112 of the protection device 104 that sent the HTTP request and the network verification component 114.

An imposter device 105 can be configured with an imposter browser 111. The imposter device 105 does not include a local verification component. Furthermore, the imposter browser 111 is not configured to obtain an SLP from local verification device each time an HTTP request is generated, or combine the SLP in each HTTP request. On the other hand, the imposter browser 111 may be configured to pose as a well-known browser by using user-agents strings. HTTP requests output by the imposter browser may include malware that is intended invade a computer that processes the HTTP request and/or links or attachments associated with the HTTP request. A computer that is invaded by malware can be susceptible to being spied upon, accessed without authorization or permission, commanded, or controlled. Once commanded or controlled, the invaded computer may operate as an imposter device 105. Even if the invaded computer includes a configured browser 110 or local verification device 112, the invaded computer may operate an imposter browser 111 while disregarding the configured browser 110 and/or local verification device 112.

The network protection system 102 can treat requests that do not include a verified short-lived password as suspected to be illegitimate traffic. In addition, the network protection system can handle the traffic suspected as being illegitimate differently than traffic determined to be legitimate. What is more, the source of the illegitimate traffic that sent an ordinary request that does not include a short-lived password can be suspected to be malicious. All traffic transmitted by the suspected source can be treated as illegitimate traffic, such as by the MD 116.

MD 116 may apply mitigation countermeasures to network traffic suspected or known to be illegitimate. Mitigation countermeasures can include, for example, blocking traffic, redirecting the traffic to a selected destination (such as a scrubbing device), and/or blacklisting the source (e.g., an IP address of the source) of the suspicious traffic. Blocked traffic is not allowed to be transmitted to its intended destination (e.g., a destination IP address indicated in the traffic). When the source of the suspicious traffic is blacklisted, future traffic from the same source IP address may be blocked.

With regards to the protected network 140, in embodiments, at least portions of the network protection system 102 are located between the external network 106 and the protected network 140. In other embodiments, at least portions of the network protection system 102 are located within the external network 106 or protected network 140. At least portions of the network protection system 102 can be located at a network edge (inside or outside of the protected network 140) or deeper within the protected network 140.

The network protection system 102, network verification component 114, and the MD 116 can be implemented as one or more physical or virtual devices. The network verification component 114 and the MD 116 can be included within the network protection system or can be computing systems separate from, but in communication with, the network protection system 102. Whether implemented as physical or virtual device(s), the network protection system 102, network verification component 114, and the MD 116 use a local or remote processing device having hardware or firmware that executes software instructions, which enables performance of the disclosed functions. Additionally, the network protection system 102, network verification component 114, and the MD 116 can share one or more hardware, firmware, and/or software components.

Network protection system 102 can include central or distributed elements for intercepting and/or analyzing network data. These elements can be passive or active and include software, firmware, and/or hardware components, such as taps, probes, or port mirrors. These elements can be positioned inline, and/or remote relative to communication links 120 or 122.

Protected devices 104 and imposter devices 105 are computing devices having hardware, software and/or firmware, such as servers, laptop devices, mobile devices (e.g., laptops, smartphones, cell phones, and tablets), network elements (e.g., routers, switches, and firewalls), embedded computer devices that are embedded in other devices (e.g., appliances, tools, vehicles, or consumer electronics). The protected devices 104 can communicate via the protected network 140 with one another or with the external network 106. The imposter devices 105 are devices that have accessed the protected network 140 without authorization or were previously protected devices 104 that are now commanded and controlled by malware.

The protected network 140 and external network 106 can include one or more networks, such as an intranet, a local area network (LAN), and/or a wide area network (WAN). In examples, the protected network 140 can be an enterprise network, such as a school network, business network, and government network, to list a few examples, that can connect to the Internet. The external network 106 is external to protected network 140 and can be included in the Internet.

The configured browser 110 and imposter browser 111 are web browsers, which are software applications for accessing information on the World Wide Web. For example, when a user activates a link to access a particular website, the web browser retrieves the content identified by the link from a web server identified by the link, renders the content, and then displays the rendered content on the user's device.

The protected device 104 and the local verification component 112 can be implemented as one or more physical or virtual devices. The local verification component 112 can be included within the protected device 104 or can be a computing system separate from, but in communication with, the protected device 104. Whether implemented as physical or virtual device(s), the protected device 104 and the local verification component 112 use local or remote hardware or firmware that executes software instructions, which enables performance of the disclosed functions. Additionally, the protected device 104 and the local verification component 112 can share one or more hardware, firmware, and/or software components.

Configured browser 110 can be configured by installing an extension or a plugin that works with a previously installed browser that or installing a specialized browser configured, wherein the previously installed browser with extension or plugin or the specialized browser are configured to perform the functions of the disclosure.

Protected device 104 is further configured by installing the local verification component 112. Local verification component 112 and network verification component 114 are synchronized and use the same algorithm to generate the SLP 136. The algorithm can be, for example, a time-based or hash-based algorithm, for example. The SLP 136 can be, for example, a time-based or a hash-based message authentication codes (HMAC)-short-lived password that lasts for a time interval (e.g., five minutes), or for a specified number of one or more uses (e.g., a one-time password (OTP)).

The installation process can include using a shared secret in which one of the protected device 104 and the network protection system 102 (the giver) shares a secret with the other of the protected device 104 and the network protection system 102 (the receiver). Once the shared secret is received and verified by the receiver, the receiver can verify the giver for synchronizing the algorithm used for generating the SLP 136 by the local verification component 112 and verifying the SLP 136 by the network verification component 114.

A configured browser 110 of a protected device 104 is configured to send an HTTP request via communication link 120 of the protected network 140 for communicating with a computing device (not shown) using the external network 106 or another protected device 104. The configured browser 110 obtains an SLP 136 from the protected device's local verification component 112 and inserts the SLP 136 in the HTTP request. The SLP can be generated using a time-based or a hash-based algorithm. Each SLP is valid for a short period of time, after which it expires. When an SLP 136 is needed from the local verification component 110, the local verification component 110 uses the time-based or hash-based algorithm to generate the SLP 136.

HTTP requests include a request line, and can optionally include a header and a body. The request line includes a method token, a URI, a protocol to be used, and an end token (referred to as a carriage return line feed (CRLF)) to indicate the end of the request line. The method token specifies a method to be performed on a resource identified by the URI. Examples of method tokens include GET, HEAD, POST, PUT, DELETE, CONNECT, OPTIONS, and TRACE. The header includes one or more fields that allow a client to pass additional information to the server about the HTTP request and/or the client that is sending the HTTP request.

The configured browser 110 is configured to insert the SLP 136 obtained from the local verification component 112 into a field 134 of the header before sending the HTTP request as a protected request 130. Each HTTP request sent by the protected devices 104 is monitored by the network protection component 102. Hence, the protected request 130 is transmitted to the network protection component 102 before being sent to its destination (e.g., a destination specified by the URI).

The imposter device 105 does not have a local verification component 112, and further has an imposter browser 111 instead of a configured browser 110. The imposter browser 111 is not configured to obtain an SLP 136 or insert the SLP in a header of any HTTP requests sent from the imposter browser 111. The imposter browser 111 is not coordinated with the network verification component 114 for generating an SLP 136 that can be verified by the network verification component 114. Accordingly, when the imposter browser 111 of the imposter device 105 sends an HTTP request, the HTTP request is transmitted as an imposter request 132 that does not include an SLP 136. Even though the imposter device 105 may use a user-agent string of a popular web browser that might go undetected, the HTTP request is known to be an imposter request 132 due to its lack of the SLP 136. Without a verification component that is synchronized with a verification component of the network verification component 114, the imposter device 105 cannot pretend it has an SLP. Even if the imposter browser 111 were to intercept and copy a previously generated SLP, the intercepted SLP would expire quickly and be of little or no value.

Upon network protection system 102 receiving an HTTP request from any device transmitting HTTP requests from the protected network 140, the network verification component 114 checks the HTTP request for an SLP 136 by determining the expected value of the current SLP 136 using the same time-based or hash-based method used by the local verification component 112. If the SLP 136 included with a received HTTP request matches the expected value, the HTTP request will be treated as legitimate traffic. If the SLP 136 included with a received HTTP request does not match the expected value, the HTTP request will be treated as non-legitimate traffic.

Figure 2:
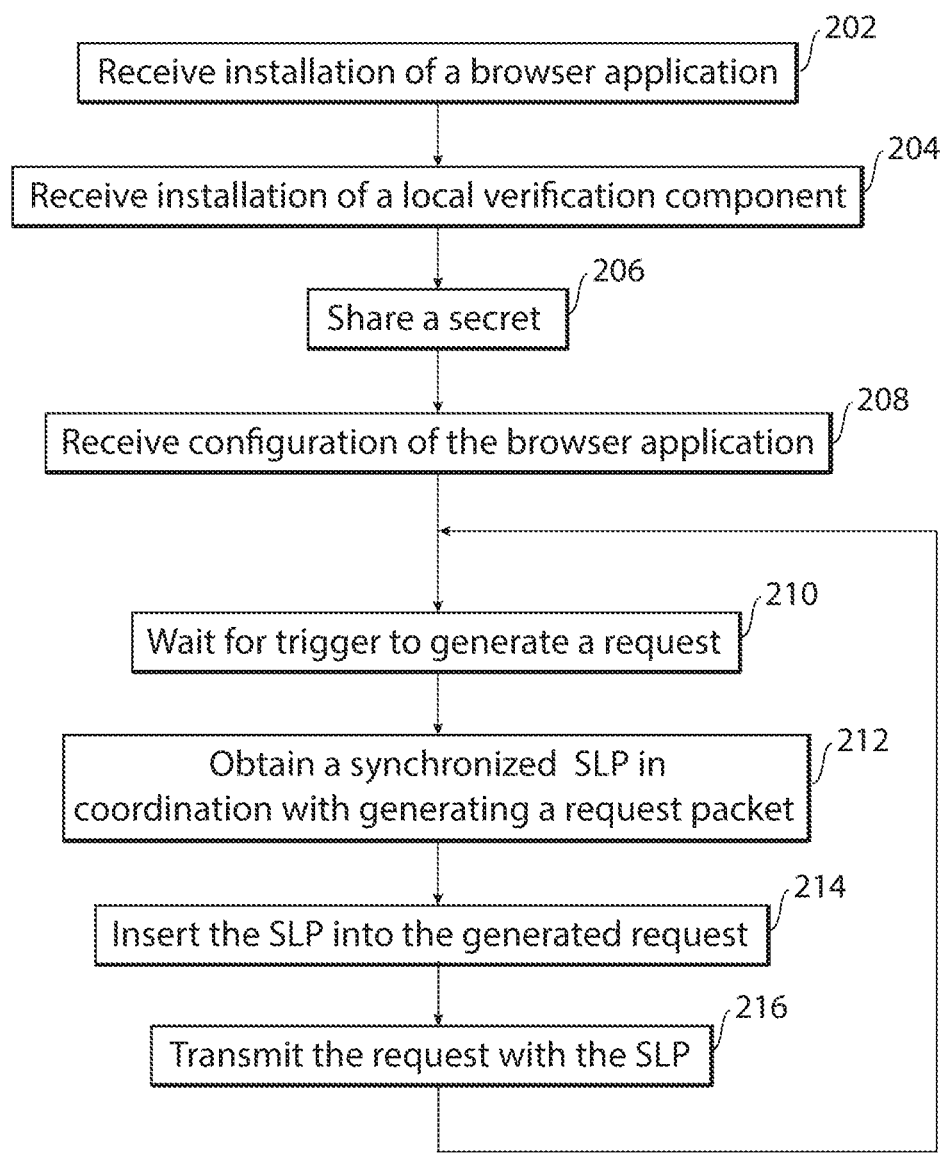
FIG. 2 is an example flowchart showing an example method performed by an example protected device of the protected network shown in FIG. 1, in accordance with an aspect of the disclosure.
Figure 3:
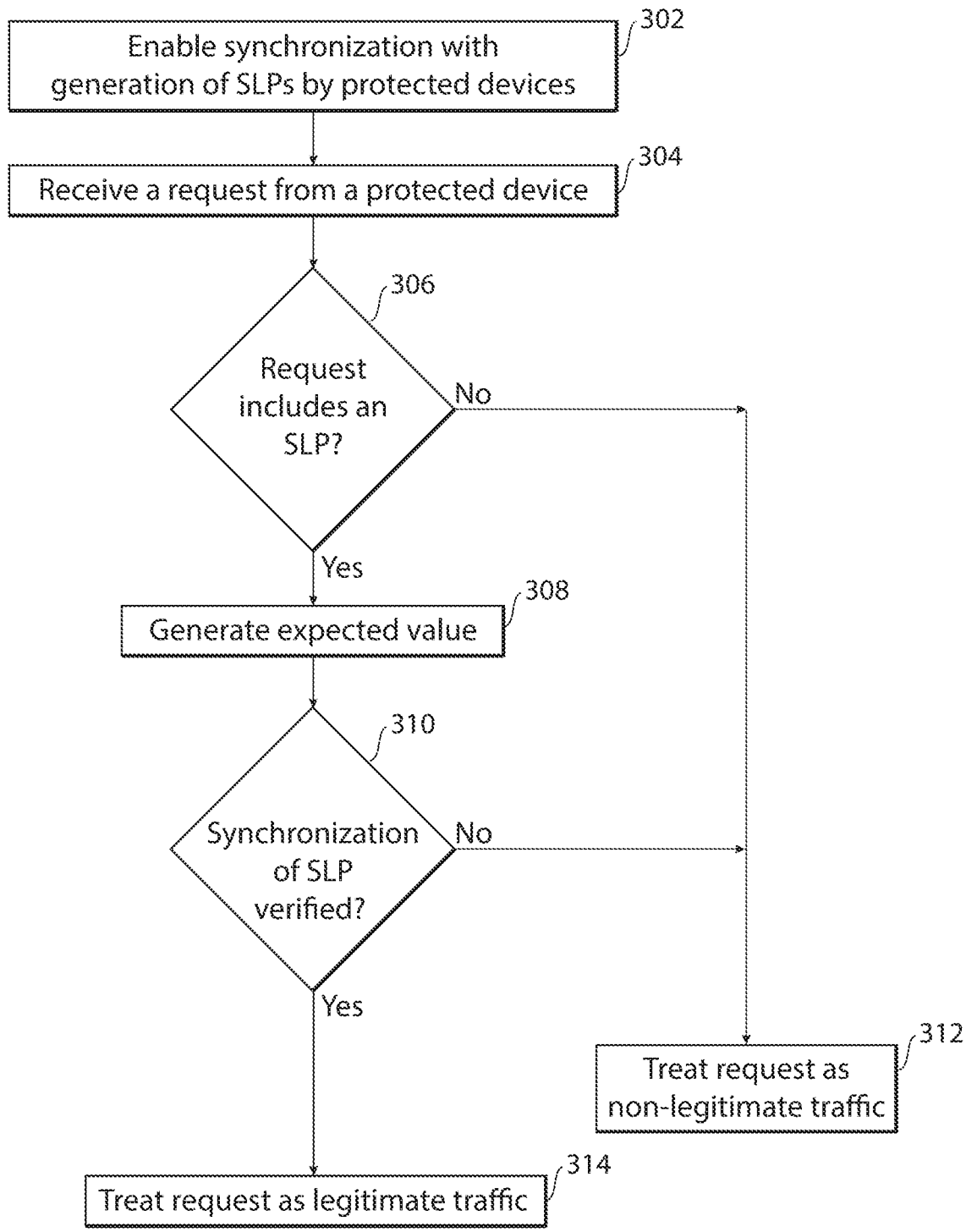
FIG. 3 is an example flowchart showing an example method performed by an example network protection system of the protected network shown in FIG. 1, in accordance with an aspect of the disclosure.
Figure 4:
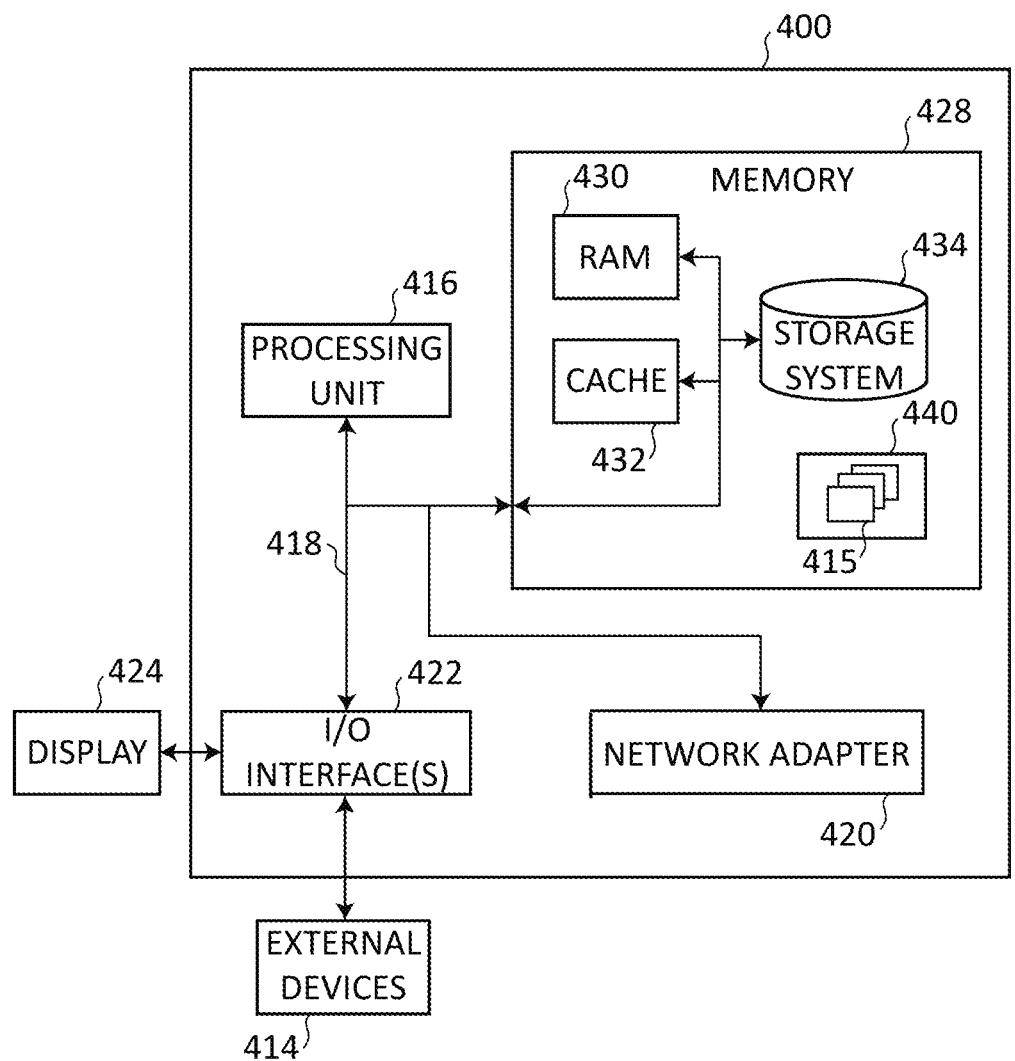
FIG. 4 illustrates an example computing system that could be used to implement the protected device or network protection system shown in FIG. 1.

With reference now to FIGS. 2 and 3, shown are flowcharts demonstrating implementation of the various exemplary embodiments. It is noted that the order of operations shown in FIGS. 2-4 is not required, so in principle, the various operations may be performed out of the illustrated order. Also, certain operations may be skipped, different operations may be added or substituted, some operations may be performed in parallel instead of strictly sequentially, or selected operations or groups of operations may be performed in a separate application following the embodiments described herein.

Language that refers to the exchange of information is not meant to be limiting. For example, the term "receive" as used herein refers to obtaining, getting, accessing, retrieving, reading, or getting a transmission. Use of any of these terms is not meant to exclude the other terms. Data that is exchanged between modules can be exchanged by a transmission between the modules, or can include one module storing the data in a location that can be accessed by the other module.

FIG. 2 shows a flowchart of operations performed by a protected device, such as protected device 104 shown in FIG. 1. The method begins with configuring the protected device operate in coordination with the network protection system 102 to perform the disclosed functions. At operation 202, the protected device receives an installation of a browser application. The browser application is configured to generate requests, when triggered, to communicate with other computers via the World Wide Web. The browser application is triggered to generate requests when a user of the protected device activates a link, such as by clicking on hyperlink or enters a Uniform Resource Locator (URL) in an address bar of a browser page displayed by the browser application, wherein the URL specifies an address on the World Wide Web.

At operation 204, the protected device receives an installation of a local verification component, such as local verification component 112 shown in FIG. 1. At operation 206, the protected device shares a secret for enabling synchronization with a network protection system, such as network protection system 102. A shared secret is a piece of data, known only to the parties involved so that any party's possession of that data can be provided as proof of identity for authentication. The shared secret can be, for example, a password, a passphrase, a big number, or an array of randomly chosen bytes. The shared secret can be shared when the local verification device is configured or at the time that an SLP is generated. Security software can facilitate sharing the secret and presented via a user interface. The secret key can be unique to each protected device or to each user of a protected device. The protected device or user would need to be authenticated, e.g., by the security software or a human security administrator in order to obtain the shared secret. At operation 208, the browser application receives a configuration in order to obtain an SLP and insert it in each transmitted request.

Once the protected device is configured as described with respect to operations 202-208, at block 210, the browser application waits for a trigger to generate a request, such as by activation of a link or input of a URL in an address bar of the browser application's window. At operation 212, an SLP is obtained in coordination with generating the request. The SLP is synchronized with an expected value generated by the network protection system. The synchronization between generation of the SLP by the local verification component and generation of the expected value by the network protection component is authorized once the protected device or its user have been authenticated through the shared secret.

At operation 214, the short-lived password is inserted into the generated request before transmitting the request. At operation 216, the request is transmitted with the SLP (e.g., with the SLP inserted into a header portion of the SLP). The method continues at operation 210.

With reference to FIG. 3, a flowchart is shown of operations performed by a network protection system, such as network protection system 102 shown in FIG. 1. The method begins with configuring the protected device operate in coordination with the network protection system 102 to perform the disclosed functions. At operation 302, the network protection system enables synchronization with generation of SLPs by the respective protected devices. Enabling the synchronization includes sharing a secret with the protected devices. Once the secret is shared and used to authorize a protected device, the network protection system synchronizes generation of an expected value when it receives a request from a protected device that includes an SLP.

At operation 304, a request is received from a protected device, wherein the request is for communicating with at least one other computer via the World Wide Web. The request can be an HTTP request. At operation 306, a determination is made whether the request includes an SLP. If the determination at operation 306 is NO, meaning the request does not include an SLP, then the method continues at operation 312. At operation 312, the request is treated as non-legitimate traffic, meaning the request is flagged as non-legitimate, an alert is generated, the request is blocked or diverted, the source of the request is treated as suspicious, etc.

If the determination at operation 306 is YES, meaning the request does include an SLP, then the method continues at operation 308. At operation 308, an expected value is generated in synchronization with the SLP included. The expected value can be generated using a time-based algorithm or a hash-based algorithm. The synchronization between generation of the expected value and the SLP can depend on sharing the secret between the network protection system and the protected device that sent the request with the SLP. Based on the shared secret having been used to authenticate the protected device with the network protection system and or to authenticate the network protection system with the protected device, the algorithms used to generate the SLP and the expected value are synchronized. When these algorithms synchronized, the SLP matches the expected value.

At operation 310, a determination is made whether the SLP is synchronized with the expected value. This can be determined by based on whether the SLP matches the expected value. If the determination at operation 310 is NO, meaning the SLP is not synchronized with the expected value, then the method continues at operation 312 (in which the request is treated as non-legitimate traffic). If the determination at operation 310 is YES, meaning the SLP is synchronized with the expected value, then the method continues at operation 314. At operation 314, the request is treated as legitimate traffic, which means the traffic is allowed to be transmitted to its intended destination as indicated by the request.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the network protection device 102 or protected devices 104 may be implemented or executed by one or more computer systems. For example, network protection device 102 and protected devices 104 can be implemented using a computer system such as example computer system 402 illustrated in FIG. 4. In various embodiments, computer system 402 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 402 is only one example of a suitable system and is not intended to suggest any limitation as to the scope of use or functionality of embodiments of the disclosure described herein. Regardless, computer system 402 is capable of being implemented and/or performing any of the functionality set forth hereinabove.

Computer system 402 may be described in the general context of computer system-executable instructions, such as program modules, being executed by a computer system. Generally, program modules may include routines, programs, objects, components, logic, data structures, and so on that perform particular tasks or implement particular abstract data types. Computer system 402 may be practiced in distributed data processing environments where tasks are performed by remote processing devices that are linked through a communications network. In a distributed data processing environment, program modules may be located in both local and remote computer system storage media including memory storage devices.

Computer system 402 is shown in FIG. 4 in the form of a general-purpose computing device. The components of computer system 402 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 402 typically includes a variety of computer system readable media. Such media may be any available media that is accessible by computer system 402, and it includes both volatile and non-volatile media, removable and non-removable media.

System memory 428 can include computer system readable media in the form of volatile memory, such as random access memory (RAM) 430 and/or cache memory 432. Computer system 402 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk, and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the disclosure.

Program/utility 440, having a set (at least one) of program modules 415, such as computer system 402, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 415 generally carry out the functions and/or methodologies of embodiments of the disclosure as described herein.

Computer system 402 may also communicate with one or more external devices 414 such as a keyboard, a pointing device, a display 424, etc.; one or more devices that enable a user to interact with computer system 402; and/or any devices (e.g., network card, modem, etc.) that enable network protection device 102 or protected devices 104 to communicate with one or more other computing devices. Such communication can occur via Input/Output (I/O) interfaces 422. Still yet, computer system 402 can communicate with one or more networks such as a local area network (LAN), a general wide area network (WAN), and/or a public network (e.g., the Internet) via network adapter 420. As depicted, network adapter 420 communicates with the other components of network system 100 via bus 418. It should be understood that although not shown, other hardware and/or software components could be used in conjunction with computer system 402. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by a protected device having a configured browser and a local verification device that is synchronized with a network verification device of a network protection device include immediate detection of requests sent by malware that is impersonating a browser and the ability to treat the request and traffic from the source of the request as illegitimate traffic without disturbing legitimate traffic. Accordingly, suspicious network activity attempting to mimic a web browser can be filtered from legitimate traffic.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A method of detecting impersonated network traffic by a computing device of a protected network protected by a network protection system, the method comprising:
receiving installation of a browser application, the browser application configured to generate requests to communicate with other computers via the World Wide Web; and
receiving a configuration for the browser application to:
obtain a locally generated short-lived password in coordination with generating a request, wherein the short-lived password is synchronized with an expected value generated by the network protection system; and
insert the short-lived password into the generated request before transmitting the request,
wherein the transmitted request is passed to the network protection system and treated as legitimate network traffic by the network protection system only if the short-lived password is verified by the network protection system.

2. The method of claim 1, wherein the requests are HTTP requests and the short-lived password is inserted into a header of the HTTP request.

3. The method of claim 1, further comprising generating the short-lived password using a time-based algorithm or a hash-based algorithm.

4. The method of claim 3, wherein generating the short-lived password includes sharing a secret with the network protection system, and synchronization of the short-lived password and the expected value depends on sharing the secret.

5. The method of claim 1, wherein receiving the configuration for the browser application includes receiving installation of an extension or plugin that cooperates with the browser.

6. The method of claim 1, wherein when the request is treated as legitimate traffic by the network protection system, the request is forwarded to an intended destination indicated by the request, otherwise the request is treated as illegitimate traffic that is flagged as illegitimate and/or blocked from being sent to the intended destination.

7. The method of claim 1, wherein the short-lived password is verified when the short-lived password matches the expected value generated by the network protection system.

8. The method of claim 1, wherein the short-lived is unsolicited and/or the request is an initial request to communicate with another computer via the World Wide Web.

9. A method of detecting impersonated network traffic by a network protection system that provides protection to a protected network, the method comprising:
enabling synchronization with generation of short-lived passwords generated locally by the respective computing devices of the protected network;
receiving a request for communicating with at least one other computer via the World Wide Web;
verifying, upon receiving the request, whether a short-lived password locally generated by a sender of the request is included with the request;
upon verification that the short-lived password is included with the request, verifying synchronization of the short-lived password with an expected value;
upon verification of synchronization of the short-lived password, treating the request as legitimate network traffic; and
otherwise, upon a lack of verification that the short-lived password is included with the request or a lack of verification of synchronization of the short-lived password, treating the request as illegitimate network traffic.

10. The method of claim 9, wherein the requests are HTTP requests and the short-lived password is inserted into a header of the HTTP request.

11. The method of claim 9, further comprising generating the expected value using a time-based algorithm or a hash-based algorithm.

12. The method of claim 11, wherein generating the expected value includes sharing a secret with computing devices of the protected network, and synchronization of the short-lived password and the expected value depends on sharing the secret.

13. The method of claim 9, wherein treating the request as legitimate traffic includes forwarding the request to an intended destination indicated by the request, and treating the request as illegitimate traffic includes flagging the request as illegitimate and/or blocking the request from being sent to the intended destination.

14. The method of claim 9, wherein the generation of the short-lived passwords by the respective computing devices of the protected network is unsolicited.

15. A computer system for detecting impersonated network traffic by a computing device of a protected network protected by a network protection system, the computer system comprising:
a memory configured to store instructions;
processor disposed in communication with said memory, wherein said processor upon execution of the instructions is configured to:
receive installation of a browser application, the browser application configured to generate requests to communicate with other computers via the World Wide Web; and
receive a configuration for the browser application to:
obtain an unsolicited short-lived password in coordination with generating a request, wherein the short-lived password is synchronized with an expected value generated by the network protection system; and
insert the short-lived password into the generated request before transmitting the request,
wherein the transmitted request is passed to the network protection system and treated as legitimate network traffic by the network protection system only if the short-lived password is verified by the network protection system.

16. The computer system of claim 15, wherein the processor upon execution of the instructions is further configured to generate the short-lived password using a time-based algorithm or a hash-based algorithm.

17. The computer system of claim 16, wherein generating the short-lived password includes sharing a secret with the network security device, and synchronization of the short-lived password and the expected value depends on sharing the secret.

18. The method of claim 15, wherein the short-lived password is generated locally by the computing device of the protected network.

19. A computer system for detecting impersonated network traffic by a network protection system that provides protection to a protected network, the computer system comprising:
- a memory configured to store instructions;
- a processor disposed in communication with said memory, wherein said processor upon execution of the instructions is configured to:
  - enable synchronization with generation of unsolicited short-lived passwords by the respective computing devices of the protected network;
  - receive a request for communicating with at least one other computer via the World Wide Web;
  - verify, upon receiving the request, whether a short-lived password is included with the request;
  - upon verification that the short-lived password is included with the request, verify synchronization of the short-lived password with an expected value;
  - upon verification of synchronization of the short-lived password, treat the request as legitimate network traffic; and
  - otherwise, upon a lack of verification that the short-lived password is included with the request or a lack of verification of synchronization of the short-lived password, treat the request as illegitimate network traffic.

20. The computer system of claim 19, wherein the processor upon execution of the instructions is further configured to generate the expected value using a time-based algorithm or a hash-based algorithm.

21. The computer system of claim 20, wherein generating the expected value includes sharing a secret with computing devices of the protected network, and synchronization of the short-lived password and the expected value depends on sharing the secret.

22. The computer system of claim 19, wherein treating the request as legitimate traffic includes forwarding the request to an intended destination indicated in the request, and treating the request as illegitimate traffic includes flagging the request as illegitimate and/or blocking the request from being sent to the intended destination.

23. The method of claim 19, wherein the short-lived passwords are generated locally by the respective computing devices of the protected network, and wherein the short-lived password that is verified is generated locally by a sender of the request.

* * * * *